United States Patent
Li et al.

(10) Patent No.: US 9,009,144 B1
(45) Date of Patent: Apr. 14, 2015

(54) DYNAMICALLY IDENTIFYING AND REMOVING POTENTIAL STOPWORDS FROM A LOCAL SEARCH QUERY

(75) Inventors: Xin Li, San Jose, CA (US); Shi Chen, Sunnyvale, CA (US); Qiying Lin, Guangzhou (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/434,773

(22) Filed: Mar. 29, 2012

Related U.S. Application Data (60) Provisional application No. 61/602,563, filed on Feb. 23, 2012.

(51) Int. Cl.
G06F 7/00 (2006.01)
G06F 17/30 (2006.01)

(52) U.S. Cl.
CPC .................... *G06F 17/30389* (2013.01)

(58) Field of Classification Search
None
See application file for complete search history.

(56) References Cited

U.S. PATENT DOCUMENTS

| | | | | |
|---|---|---|---|---|
| 7,039,631 | B1 * | 5/2006 | Finger, II | 1/1 |
| 7,409,383 | B1 * | 8/2008 | Tong et al. | 1/1 |
| 7,945,579 | B1 * | 5/2011 | Tong et al. | 707/769 |
| 8,290,956 | B2 * | 10/2012 | Maim | 707/737 |
| 8,290,967 | B2 * | 10/2012 | Vailaya et al. | 707/755 |
| 2007/0162443 | A1 * | 7/2007 | Liu et al. | 707/5 |
| 2009/0182729 | A1 * | 7/2009 | Lu et al. | 707/5 |
| 2009/0248669 | A1 * | 10/2009 | Shetti et al. | 707/5 |
| 2010/0257150 | A1 * | 10/2010 | Lu et al. | 707/713 |
| 2011/0145247 | A1 | 6/2011 | Norris et al. | |
| 2012/0262533 | A1 * | 10/2012 | Gannu et al. | 348/14.07 |

* cited by examiner

*Primary Examiner* — Loan T Nguyen
(74) *Attorney, Agent, or Firm* — Dority & Manning, P.A.

(57) ABSTRACT

Dynamic identification and removal of potential stopwords from a search query is provided. A search query comprising plural terms is received. A possible stopword among the terms that appears in a predefined list of possible stopwords is identified. Query splits are determined based on one or more query patterns, each query split comprising a location portion using a first subset of the plural terms and a subject portion using a second subset. Either the location portion or the subject portion of the query splits is modified, by removing the possible stopword from that portion. The search engine is queried with the location portion and the subject portion for each of the query splits, and scored search results are obtained for each of the query splits. The search results returned for at least one of the query splits is selected to return as a response to the search query.

17 Claims, 4 Drawing Sheets

DYNAMICALLY IDENTIFYING AND REMOVING POTENTIAL STOPWORDS FROM A LOCAL SEARCH QUERY

CROSS-REFERENCE TO RELATED APPLICATION

The present application claims the benefit of U.S. Provisional Patent Application Ser. No. 61/602,563, entitled "Dynamically Identifying And Removing Potential Stopwords From A Local Search Query," filed on Feb. 23, 2012, the contents of which are hereby incorporated by reference in its entirety for all purposes.

BACKGROUND

The present disclosure generally relates to search systems, and, in particular, to dynamically identifying and removing potential stopwords from a local search query.

Internet search engines aim to identify resources (e.g., web pages, images, text documents, multimedia context) that are relevant to a user's needs, and to present information about the resources in a manner that is most useful to the user. Internet search engines return a set of search results in response to a user-submitted query.

For mapping search systems, the query must typically be interpreted with some geographic context. In particular, a query can be interpreted based on a search subject (e.g., a {what}) and a location (e.g., a {where}). To improve the interpretation, stopwords (i.e., words that are not particularly helpful in identifying a query subject or location) can be removed from the query.

SUMMARY

The disclosed subject matter relates to a machine-implemented method for dynamically identifying and removing potential stopwords from a search query. The method comprises receiving a search query comprising plural terms, identifying a possible stopword among the plural terms that appears in a predefined list of possible stopwords, and determining one or more query splits by matching the search query to one or more query patterns, each query split comprising at least one of a location portion that uses one or more of the plural terms or a subject portion that uses one or more of the plural terms. The method further comprises modifying at least one of the location portion or the subject portion of each of the one or more query splits by removing the possible stopword from that portion, querying the search engine with the location portion and the subject portion for each of the one or more query splits, and respectively obtaining scored search results for each of the one or more query splits, and selecting the search results returned for at least one of the one or more query splits to return as a response to the search query.

The disclosed subject matter further relates to a system for dynamically identifying and removing potential stopwords from a search query. The system comprises one or more processors, and a machine-readable medium comprising instructions stored therein, which when executed by the processors, cause the processors to perform operations comprising receiving a search query comprising plural terms, and identifying a possible stopword among the plural terms that appears in a predefined list of possible stopwords. The operations further comprise determining one or more query splits by matching the search query to one or more query patterns, each query split comprising at least one of a location portion that uses one or more of the plural terms or a subject portion that uses one or more of the plural terms, determining whether the possible stopword is more closely associated with the location portion or the subject portion of the plurality of query splits, and removing the possible stopword from either the location portion or the subject portion of the plurality of query splits, based on the determination of whether the possible stopword is more closely associated with the location portion or the subject portion. In addition, the operations comprise querying the search engine with the location portion and the subject portion for each of the one or more query splits, and respectively obtaining scored search results for each of the one or more query splits, and selecting the search results returned for at least one of the one or more query splits to return as a response to the search query.

The disclosed subject matter also relates to a machine-readable medium comprising instructions stored therein, which when executed by a system, cause the system to perform operations comprising receiving a search query comprising plural terms, identifying a possible stopword among the plural terms that appears in a predefined list of possible stopwords, and determining one or more query splits by matching the search query to one or more query patterns, each query split comprising at least one of a location portion that uses one or more of the plural terms or a subject portion that uses one or more of the plural terms. The operations further comprise determining whether the possible stopword is more closely associated with the location portion or the subject portion of the plurality of query splits, and removing the possible stopword from either the location portion or the subject portion of the plurality of query splits, based on the determination of whether the possible stopword is more closely associated with the location portion or the subject portion. In addition, the operations comprise querying the search engine with the location portion and the subject portion for each of the one or more query splits, and respectively obtaining scored search results for each of the one or more query splits, and selecting the search results returned for at least one of the one or more query splits to return as a response to the search query, wherein the selected search results are the search results with the highest score.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims.

However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter dynamically identifies and removes possible stopwords from a search query by rewriting the query based on known query patterns, removing possible stop words from some of the rewritten query patterns, and issuing multiple queries against the backend search server based on the rewritten query patterns. Per the disclosed subject matter, a search query comprising plural terms is received. A term of the plural terms appearing within a predefined list of stopwords is identified as a possible stopword. The plural terms are split into multiple query splits according to one or more query patterns. Each query split uses some of the plural terms in the search query as a location value (e.g., {where}) and some of the plural terms in the search query as a subject value (e.g., {what}). Either the location value or the subject value for one or more of the query splits is modified by removing the term identified as a possible stop word from the value. The search engine is queried with the location value and the subject value for each query split, and scored search results are obtained for each split. A query split is selected based on the returned scores. In some cases, the selected query split may not include the possible stop word, indicating dynamic identification and removal of that possible stop word. In some cases, the selected query split may include the possible stopword, indicating dynamic rejection of the possible stop word as a stopword.

Figure 1:
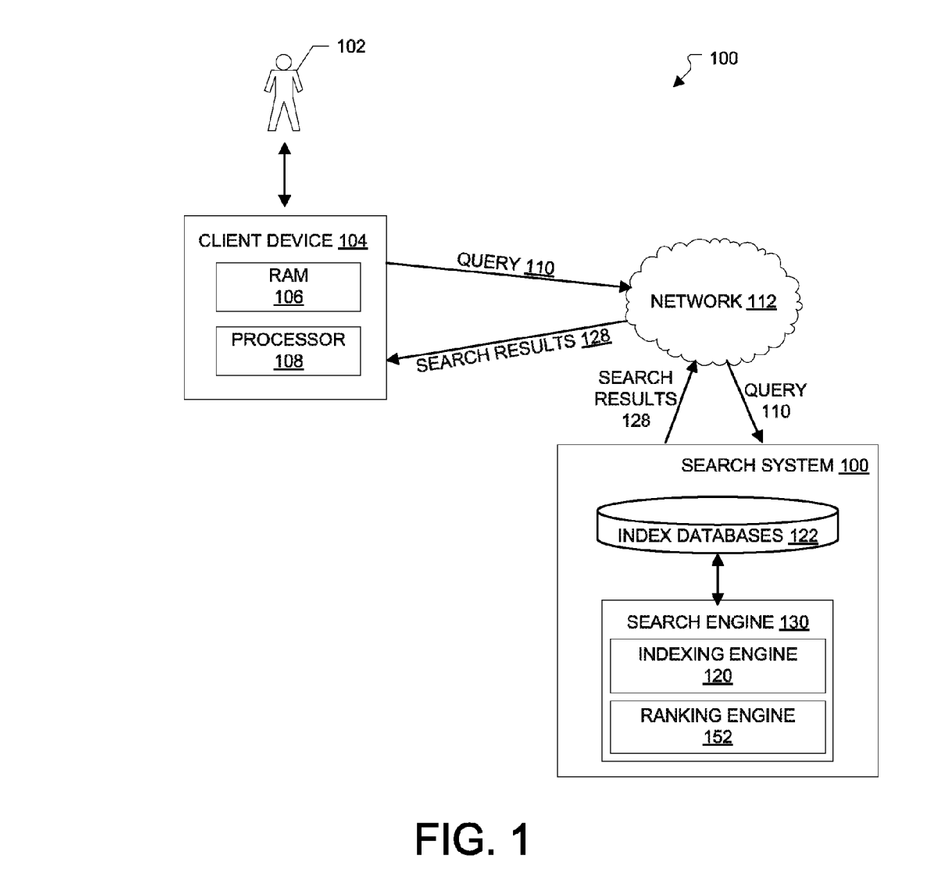
FIG. 1 illustrates an example search system.

FIG. 1 illustrates an example search system. More particularly, system 100 can provide search results relevant to submitted queries (e.g., queries submitted over an internet, an intranet, or another client and server environment). The search system 100 is an example of an information retrieval system in which the systems, components, and techniques described herein can be implemented.

A user 102 can interact with the search system 100 through a client device 104. For example, the client 104 can be a computer coupled to the search system 100 through a local area network (LAN) or wide area network (WAN), e.g., the Internet. In some implementations, the search system 100 and the client device 104 can be one machine. For example, a user can install a desktop search application on the client device 104. The client device 104 will generally include a random access memory (RAM) 106 and a processor 108.

A user 102 can submit a query 110 to a search engine 130 within the search system 100. When the user 102 submits the query 110, the query 110 is transmitted to the search system 100 (e.g., through a network 112). The search system 100 can be implemented, for example, as one or more computer programs running on one or more computers in one or more locations that are coupled to each other through a network. The search system 100 includes one or more index databases 122 and a search engine 130. The search system 100 responds to the query 110 by generating search results 128, which are transmitted to the client device 104 in a form that can be presented to the user 102 (e.g., as a search results web page to be displayed in a web browser running on the client device 104).

When the query 110 is received by the search engine 130, the search engine 130 identifies resources that match the query 110. The search engine 130 will generally include an indexing engine 120 and a ranking engine 152. The indexing engine 120 indexes resources (e.g., web pages, images, or news articles on the Internet) found in one or more corpora (e.g., collections or repositories of content) in the one or more index databases 122 that store the index information. The ranking engine 152 (or other software) ranks the resources that are found to match the query 110. The indexing and ranking of the resources can be performed using conventional techniques.

In some implementations, the one or more index databases 122 store different types of resources that can be searched separately using part or all of the query 110. For example, one or more of the index databases 122 can store index information associated with geographic resources, local resources, or other types of specifically indexed resources. The search engine 130 can submit the query or a query component to particular indices depending the interpretation of the query, e.g., using a query pattern as described below. The search engine 130 can transmit the search results 128 through the network to the client device 104 for presentation to the user 102.

Figure 2:
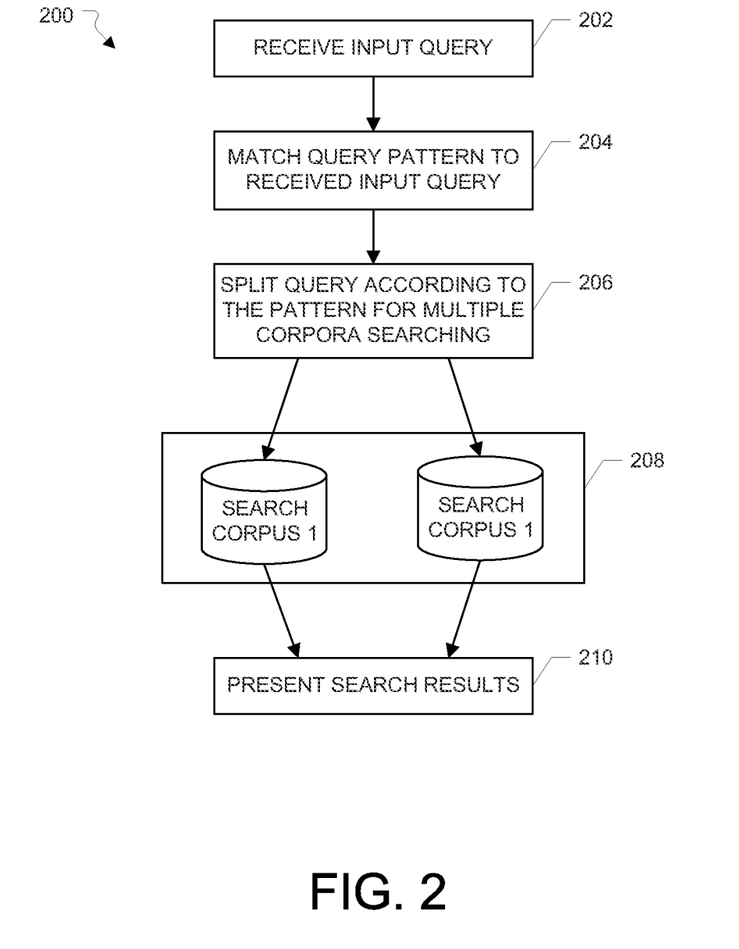
FIG. 2 illustrates an example process by which a search is performed based on a search query.

FIG. 2 illustrates an example process by which a search is performed based on a search query. For convenience, and by way of non-limiting example, the search process 200 will be described with respect to a system (e.g., a system including one or more computing devices) that performs the search process 200.

At 202, the system receives an input query. For example, the query can be received from a user through a user interface associated with a search system (e.g., the search system 100). In some implementations, the query is received in a user interface associated with a particular set of resources. In particular, the query can be received in a user interface of a mapping application that identifies geographic locations and other information associated with geographic locations based on user input.

For example, an input query of "san francisco" can result in a map of San Francisco being displayed. Similarly, a query of "city hall san francisco" can result in information associated with San Francisco's city hall being displayed relative to a map of San Francisco or to a relevant portion of San Francisco. The information can include, for example, the address of city hall, a phone number for city hall, a position locator of city hall on the displayed map, images, reviews, links to web pages, and other responsive information. In another example, multiple results can be displayed relative to a displayed map. For example, the query "restaurants near opera san francisco" can provide multiple mapped results for particular restaurants within a specified proximity of the opera house in San Francisco.

At 204, the system matches the received query to a query pattern. A query pattern provides one or more predefined rules for interpreting a received query. In some implementations, a number of query patterns are defined manually. In some implementations, query patterns are dynamically generated by testing various ways of splitting queries into candidate queries, running the candidate queries to obtain scored search results, and scoring the patterns of the candidate queries based on the scores received for their associated search results. A particular score, or confidence, can be required to select a query pattern from the candidate query patterns.

A query pattern can include, for example, stopwords, a connector, a confidence value, and a query split strategy. Stopwords, e.g., "a" and "the" are words that do not provide information that assists in identifying search results or search locations (e.g., words that do not provide information that influences the results or locations). The stopwords included in a query pattern can be removed from a received query and ignored when matching the received query to the query pattern. In a mapping search system, certain phrases such as "map of" and "location of," can be removed from a received query as stopwords since all results in such a system are maps or locations.

One solution for identifying and removing stopwords from a received query is to simply compare those terms within the query to a predefined list of known stopwords. However, this approach may be inaccurate since some words can be meaningless stopwords in one query (e.g., "visiting" in "visiting new york") but meaningful subject matter terms in another query (e.g., "visiting" in "visiting nurse new york"). Thus, as explained in further detail below, the subject disclosure provides a system and method for dynamically identifying and removing possible stopwords from a search query.

As noted above, a query pattern can be associated with a particular confidence value. The confidence indicates a likelihood that a given query that matches a query pattern is correctly interpreted according to the query pattern. For example, a query that matches the query pattern of the form {what} near {where} (e.g., "pizza near new york") can have a higher confidence than a query that matches a query pattern in the form {what} in {where} (e.g., "pizza in New York") because query interpretations for queries that match the (what) near {where} query pattern produce fewer false positives than query interpretations for queries that match the {what} in (where) query pattern.

Query patterns can be represented in a protocol buffer ("protobuffer" hereinafter). A protobuffer is a language-neutral, platform-neutral, extensible way of serializing structured data. For example, the query pattern (what) near {where} can be described in a protobuffer as follows:
 type: CONNECTOR
 split_type: SPLIT_EXPLICIT connector: "near"
 location_first: false
The query pattern describes a query where the term "near" is used as a connector, and separates the {what} and {where} portions of the query. The "location_first: false" flag indicates that when the connector term "near" occurs at the beginning of a query, this pattern does not apply. As a result, this query pattern describes a query of the form {what} near {where}, where the (what) term cannot be empty since the connector "near" cannot be the first term in the query. As a result, the pattern is matched to queries such as "pizza near times square" and "burgers near 4th & king streets." When the pattern is matched, the pattern can be split at the connector into corresponding {what} and {where} query components.

Other types of query patterns can be generated and/or provided. A prefix type query pattern has the form stopwords+{query}. In this example, {query} represents any valid query without the initial stopwords. When a received query is matched to a prefix type query pattern, the stopwords are removed, and the remaining {query} is further matched to one or more other query patterns, as described in greater detail below. Examples of queries in this form include "map of {query}," "location of {query}," and "where is {query}." The dynamic determination and removal of stopwords will be described in greater detail below.

A suffix type query pattern has the form: {query}+stopwords. Similar to the prefix type query pattern, when a received query is matched to a suffix type query pattern, the stopwords are removed and the remaining {query} is further matched to one or more other query patterns. Examples of queries in this form include "{query} street map," and "{query} map." Furthermore, a prefix_suffix type query pattern has the form: stopwords+{query}+stopwords. Again, stopwords are removed, leaving the remaining query portion for additional processing. An example query in this form is "map of texas cities."

Combinations of query patterns can also be generated. For example, a prefix_connector type query pattern has the form: {subject}+connector+{location} OR stopwords+{location}+connector+{subject}. For a query matching this type of query pattern, the stopwords are removed and the query split according to the connector, e.g., into the {subject} component and the {location} component. An example query in this form is "map of {subject} near {location}."

Upon receiving a query and removing its stopwords (as further described below), the system tokenizes the query such that every term in the query is assigned to a token, and every token represents a single term or phrase in the query. The query can then be represented by a vector of tokens that can then be matched against the stored query patterns. For example, the query "pizza near new york" can be tokenized into the vector <pizza> <near> <new york> which can then be matched to the query pattern {what} {connector} {where} for the connector "near".

At 206, the system splits the query into query components according to the matching query pattern. In some implementations, a query can be split more than once depending on the matched query patterns. For example, a query that matches the query pattern {what} near {where} can be split into query components corresponding to {what} and {where}. Each of these components can be used to separately search specialized indexes (e.g., the {where} component can be used to search a geocoding index). Thus, the query "pizza near times square" can be split into a "pizza" component and a "times square" component. In another example, the query "map of restaurants near times square" can be first split according to the prefix type query pattern to remove the "map of" stopwords. The remaining query portion "restaurants near times square" can be subsequently split into query components "restaurants" and "times square" since it matches the {what} near {where} connector type query pattern.

Received queries that match a query pattern are split according to the split type defined by the matching query pattern. For example, a query that matches a query pattern with a "split_exact" query split type is split according to the identified query pattern. A query matching a query pattern with an "all" type of query split can be split in any or all possible ways.

A query that matches a query pattern with a "local" query split type is split so that it has a nonempty {what} portion. The split can have an empty {where} portion, though the {where} portion need not be empty. For example, if the query "phone number of city hall" matches a query pattern having a "local" query split type, the query can be split to have a {what} portion of "phone number" and a {where} portion of "city hall", or to have a {what} portion of "phone number of city hall" and no {where} portion (e.g., the location can be implicit in the current map or user location information).

A query that matches a query pattern having a "geocode" query split type is split so that it has an empty {what} portion. For example, the query can simply identify a location, e.g., by name or address. Thus, the query, "401 van ness avenue, san francisco" can match a query pattern having a "geocode" query split type, and can be split so that it has an empty {what} portion and a non-empty {where} portion (i.e., 401 van ness avenue, san francisco). A geocode index can be searched for the precise location (i.e. geographical coordinates) corresponding to the {where} portion of the split query. This index can also identify what is located at or nearby that address, e.g., San Francisco City Hall, without a specific {what} query component.

At 208, the system uses the components of the split query to search one or more corresponding indices. In some implementations, the query can be split more than once based on the applicable matching query patterns, and each portion of the split query can be used to search a corresponding index related to a particular corpus of documents. For example, when a query is split into a {what} portion and a {where} portion, the system can use the {where} portion to search a geocoding index, and the {what} portion to search a local search index. In some implementations, the search system first searches the geocoding index to identify geographical coordinates corresponding to the {where} component of the split query, and subsequently searches a local search index to identify documents that match the {what}component of the split query that have been geocoded to the {where} component. For example, given the query "pizza near times square," split into a {what} component of "pizza" and a {where} component of "times square," the system first searches a geocode index to identify the geolocation of "times square," and then searches a local search index to identify documents that include the term "pizza" and that have been geocoded to a location that is near "times square".

At 210, the system presents one or more search results responsive to the received search query. The results can be ranked, (e.g., based on how well the results match the search query), and only a specified number of top ranked results can be presented. For example, presentation of the results for the search "pizza near times square" can include displaying the location of a plurality of pizza restaurants on a map of Manhattan where the displayed pizza restaurants are located near Times Square.

As noted above, stopwords can be removed from a received query prior to matching the query to a query pattern. This can be done, for example, by comparing the terms within a query against a predefined list of known stopwords. For example, the term "visiting" in the input query "visiting new york" may appear within a predefined list of known stopwords. Thus, "visiting" can be removed from the input query, resulting in a modified query of "New York". The resulting query can match a query pattern with a geocode type query split, and be split into a {where} portion of "new york" and an empty {what} portion.

However, this approach can be improved upon since some stopwords can be meaningless in one query (e.g., "visiting" in "visiting new york"), but meaningful in another (e.g., "visiting" in "visiting nurse new york"). Thus, instead relying on a list of words as definite stopwords, the list can be considered a list of possible stopwords. In this way, potential stopwords can be dynamically identified and removed as actual stopwords from some search queries, but identified and left in place as meaningful query terms in other search queries.

For example, a search query comprising plural terms can be received. A term of the plural terms appearing in a predefined list of stopwords can be identified as a possible stopword. The query can be matched to one or more query patterns as described above, and the terms of the query split into one or more components according to the splitting rules of the matching query patterns. Each query split can use some or all of the plural terms in the search query as a location value (e.g., {where}) and some or all of the plural terms in the search query as a subject value (e.g., {what}). Either the location value, the subject value, or both, for one or more of the query splits can be modified by removing the term identified as a possible stop word from the value. The search engine can be queried with the location value and the subject value (which may be modified) for each query split, and scored search results can be obtained for each split. A query split can be selected based on the returned scores. In some cases, the selected query split may not include the possible stop word, indicating dynamic identification and removal of that possible stop word. In some cases, the selected query split may include the possible stopword, indicating dynamic rejection of the possible stop word as a stopword.

Two examples will now be provided based on the above description. In Examples 1 and 2, the input search queries of "visiting new york" and "visiting nurse new york" are described, and the term "visiting" is included in a list of possible stopwords.

EXAMPLE 1

Query of "Visiting New York"

The query "visiting new york" can be split in a number of ways as indicated by matching predefined query patterns, where each query split comprises a location value (e.g. {where}) and a subject value (e.g., {what}) as described above. Example query splits can include:
Split 1: what { }; where {visiting new york}
Split 2: what {visiting}; where {new york}
Split 3: what {visiting new york}; where: { }

A stopword removal rule can specify removing a potential stopword from either the location value, the subject value or both for the query splits. In this case, the rule can specify removing the possible stopword "visiting" from the location value only, since "visiting" is likely to be a stop word for a location query, but may not be a stop word for a subject query. Thus, the term "visiting" can be removed from the {where} value of the identified splits, resulting in the following modified query splits:
Split 1: what { }; where {new york}
Split 2: what {visiting}; where {new york}
Split 3: what {visiting new york}; where { }

A search engine can then be queried with the location value and the subject value for each query split to obtain search results for each query split. In this example, because {new york} is a well-known location, but {visiting} is not a popular search term, split 1 will typically have better search results than splits 2 and 3, and the search results for split 1 can be returned in response to the query. In this way, the possible stopword "visiting" is dynamically recognized and removed from the search query "visiting new york."

EXAMPLE 2

Query of "Visiting Nurse New York"

The query "visiting nurse new york" can similarly be split according to one or more matching query patterns into a location portion and a search portion, e.g., as indicated below:

Split 1: what { }; where {visiting nurse new york}
Split 2: what {visiting nurse}; where {new york}
Split 3: what {visiting nurse new york}; where { }

The possible stopword "visiting" can be identified, and a stopword removal rule can specify that the term "visiting" be removed only from the {where} values of the query splits, as follows:

Split 1: what { }; where {nurse new york}
Split 2: what {visiting nurse}; where {new york}
Split 3: what {visiting nurse new york}: where: { }

A search engine can then be queried with the location value and the subject value for each query split to obtain search results for each query split. In this example, since "new york" is a well known location, and "visiting nurse" is a well known search subject, split 2 will yield high quality search results, while splits 1 and 3 will not. Thus, the possible stop word "visiting" will be dynamically retained as a meaningful search term, and used to provide search results to the user in response to the query "visiting nurse new york."

Figure 3:
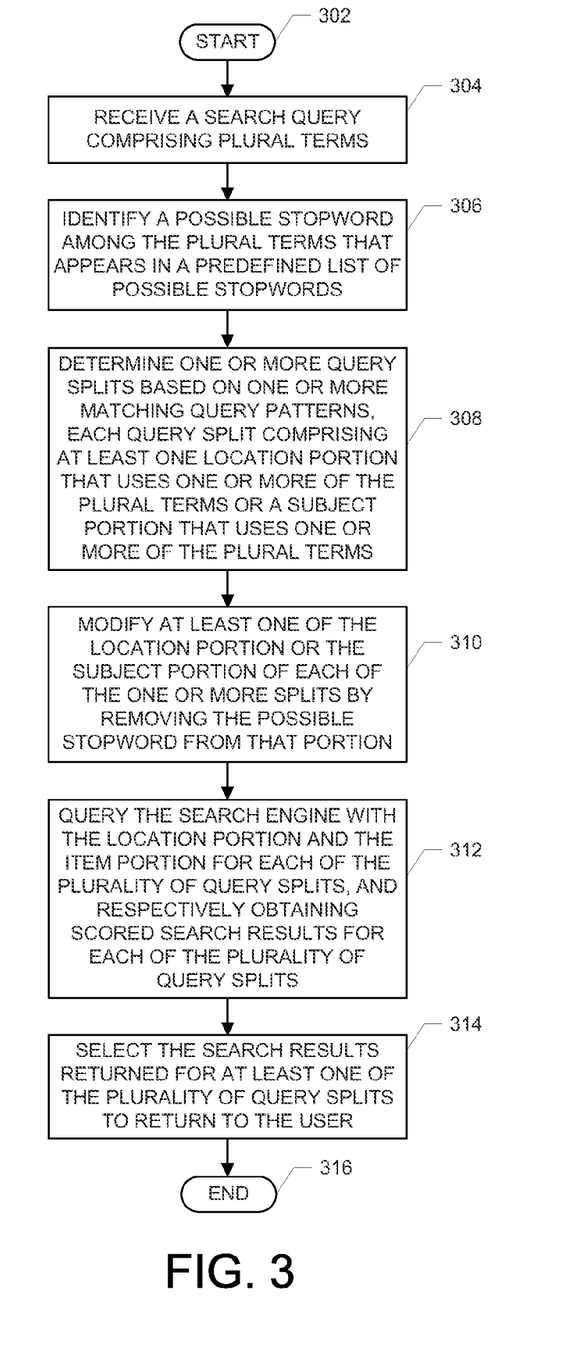
FIG. 3 illustrates an example process by which a potential stopword is dynamically identified and removed from a search query.

FIG. 3 illustrates an example process by which a potential stopword is dynamically identified and removed from a search query. Following start block 302, a search query comprising plural terms is received at step 304. At step 306, a possible stopword among the plural terms that appears in a predefined list of possible stopwords is identified. The predefined list of possible stopwords can include connectors, which appear between and connect search query terms.

At step 308, one or more query splits are determined based on one or more matching query patterns. Each query split includes a location portion that may be empty or may use some or all of the plural terms of the search query, and a subject portion that may be empty or that may use some or all of the plural terms of the search query.

At step 310, a stopword removal rule can be used to remove the possible stopword from either the location portion, the subject portion or both portions of each of the one or more query splits. In this regard, a determination can be made whether the possible stopword is more closely associated with the location portion or the subject portion of the plurality of query splits. The possible stopword can be removed from the location portion of the one or more splits when it is more closely associated with the subject portion. On the other hand, the possible stopword can be removed from the subject portion of the one or more splits when it is more closely associated with the location portion.

At step 312, the search engine can be queried with the location portion and the subject portion for each of the one or more query splits, and scored search results can be respectively obtained for each of the one or more query splits.

At step 314, the search results returned for at least one of the one or more query splits is selected to return as a response to the search query. The selected search results can be the search results with the highest score. The selected search results can correspond to a query split in which the possible stopword was removed, or to a query split in which the possible stopword was not removed. The process then ends at end block 316.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
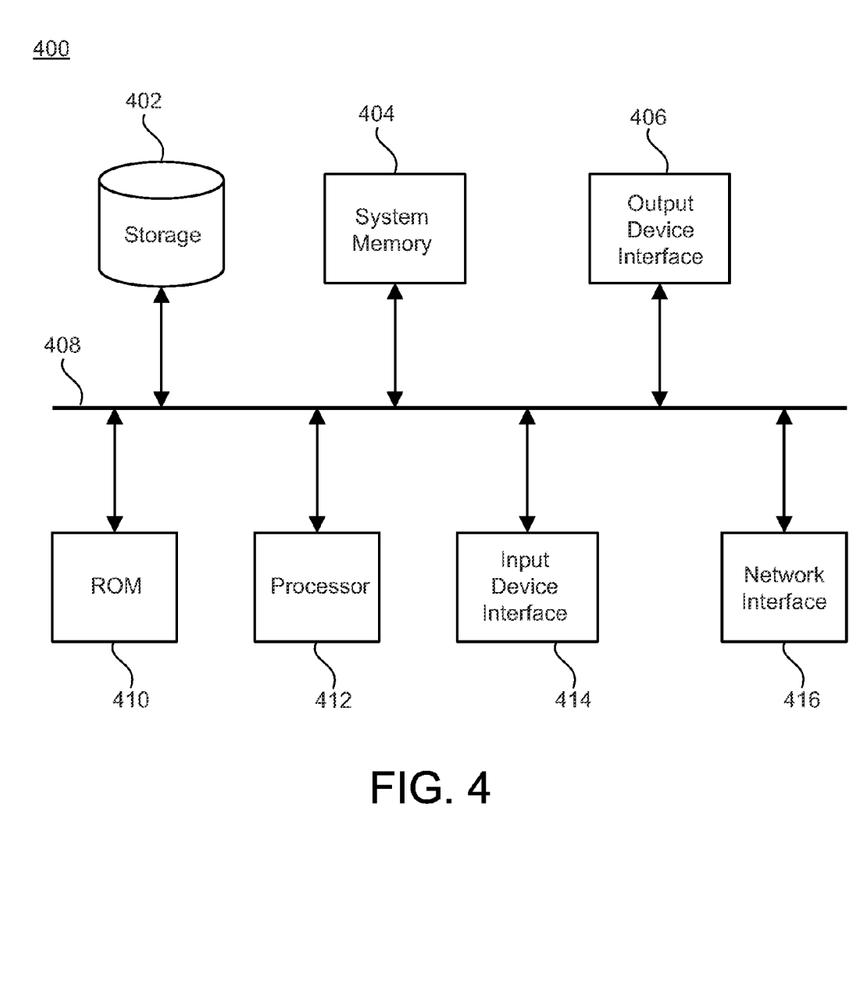
FIG. 4 conceptually illustrates an example electronic system with which some implementations of the subject technology are implemented.

FIG. 4 conceptually illustrates an example electronic system with which some implementations of the subject technology are implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for processing a search query in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback: and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for dynamically identifying and removing potential stopwords from a search query, the method comprising:
   receiving a search query comprising plural terms;
   identifying a possible stopword among the plural terms that appears in a predefined list of possible stopwords;
   determining one or more query splits by matching the search query to one or more query patterns, wherein each query pattern corresponds to a respective rule for interpreting the search query, wherein each query pattern is matched to the search query based on the respective rule, and wherein each query split comprises at least one of a location portion that uses one or more of the plural terms or a subject portion that uses one or more of the plural terms;
   removing the possible stopword from at least one of the location portion or the subject portion for at least one of the query splits based on a stopword removal rule, wherein the stopword removal rule specifies whether to remove the stopword from the location portion only, the subject portion only, or both the location portion and the subject portion;
   querying the search engine with the location portion and the subject portion for each of the one or more query splits, and respectively obtaining scored search results for each of the one or more query splits; and
   selecting the search results returned for at least one of the query splits to return as a response to the search query.

2. The method of claim 1, wherein the selected search results correspond to a query split in which the possible stopword was removed.

3. The method of claim 1, wherein the selected search results correspond to a query split in which the possible stopword was not removed.

4. The method of claim 1, wherein the selected search results are the search results with the highest score.

5. The method of claim 1, further comprising determining whether the possible stopword is more closely associated with the location portion or the subject portion of the plurality of query splits.

6. The method of claim 5, wherein removing the possible stopword comprises removing the possible stopword from the location portion when the possible stopword is more closely associated with the subject portion.

7. The method of claim 5, wherein removing the possible stopword comprises removing the possible stopword from the subject portion when the possible stopword is more closely associated with the location portion.

8. A system for dynamically identifying and removing potential stopwords from a search query, the system comprising:
   one or more processors; and
   a non-transitory machine-readable medium comprising instructions stored therein, which when executed by the processors, cause the processors to perform operations comprising:
      receiving a search query comprising plural terms;
      identifying a possible stopword among the plural terms that appears in a predefined list of possible stopwords;
      determining one or more query splits by matching the search query to one or more query patterns, wherein each query pattern corresponds to a respective rule for interpreting the search query, wherein each query pattern is matched to the search query based on the respective rule, and wherein each query split comprises at least one of a location portion that uses one or more of the plural terms or a subject portion that uses one or more of the plural terms;
      removing the possible stopword from at least one of the location portion or the subject portion for at least one of the query splits based on a stopword removal rule, wherein the stopword removal rule specifies whether to remove the stopword from the location portion only, the subject portion only, or both the location portion and the subject portion;
      querying the search engine with the location portion and the subject portion for each of the one or more query splits, and respectively obtaining scored search results for each of the one or more query splits; and selecting the search results returned for at least one of the query splits to return as a response to the search query.

9. The system of claim 8, wherein the selected search results correspond to a query split in which the possible stopword was removed.

10. The system of claim 8, wherein the selected search results correspond to a query split in which the possible stopword was not removed.

11. The system of claim 8, wherein the selected search results are the search results with the highest score.

12. The system of claim 8, wherein removing the possible stopword comprises removing the possible stopword from the location portion when the possible stopword is more closely associated with the subject portion.

13. The system of claim 8, wherein removing the possible stopword comprises removing the possible stopword from the subject portion when the possible stopword is more closely associated with the location portion.

14. A non-transitory machine-readable medium comprising instructions stored therein, which when executed by a processor, cause the processor to perform operations comprising:

receiving a search query comprising plural terms;

identifying a possible stopword among the plural terms that appears in a predefined list of possible stopwords;

determining one or more query splits by matching the search query to one or more query patterns, wherein each query pattern corresponds to a respective rule for interpreting the search query, wherein each query pattern is matched to the search query based on the respective rule, and wherein each query split comprises at least one of a location portion that uses one or more of the plural terms or a subject portion that uses one or more of the plural terms;

removing the possible stopword from at least one of the location portion or the subject portion for at least one of the query splits based on a stopword removal rule, wherein the stopword removal rule specifies whether to remove the possible stopword from the location portion only, the subject portion only, or both the location portion and the subject portion;

querying the search engine with the location portion and the subject portion for each of the one or more query splits, and respectively obtaining scored search results for each of the one or more query splits; and selecting the search results returned for at least one of the query splits to return as a response to the search query, wherein the selected search results are the search results with the highest score.

15. The non-transitory machine-readable medium of claim 14, wherein the selected search results correspond to a query split in which the possible stopword was removed.

16. The non-transitory machine-readable medium of claim 14, wherein the selected search results correspond to a query split in which the possible stopword was not removed.

17. The non-transitory machine-readable medium of claim 14, wherein removing the possible stopword comprises:

removing the possible stopword from the location portion when the possible stopword is more closely associated with the subject portion; and removing the possible stopword from the subject portion when the possible stopword is more closely associated with the location portion.

\* \* \* \* \*